United States Patent [19]

Beckman

[11] 4,192,270
[45] Mar. 11, 1980

[54] FUEL SYSTEM

[76] Inventor: Christopher P. Beckman, 996 Kelley Springs Rd., Harvest, Ala. 35749

[21] Appl. No.: 1,960

[22] Filed: Jan. 8, 1979

[51] Int. Cl.² ............................................. F02B 31/00
[52] U.S. Cl. ........................... 123/122 A; 123/52 MV; 261/144; 261/145
[58] Field of Search ......... 123/122 A, 122 AC, 52 R, 123/52 MV, 52 MC; 261/144, 145

[56] References Cited

U.S. PATENT DOCUMENTS

| 4,016,847 | 4/1977 | Rychlik | 123/122 AA |
| 4,031,875 | 6/1977 | Tyler | 123/122A |
| 4,044,741 | 8/1977 | Swingley | 123/122 A |
| 4,100,899 | 7/1978 | Chilton | 123/122 A |
| 4,147,144 | 4/1979 | Furucz | 123/122 A |

Primary Examiner—Ronald H. Lazarus
Attorney, Agent, or Firm—C. A. Phillips

[57] ABSTRACT

A fuel system for an internal combustion engine in which an air-gasoline mixture from a carburetor is fed through a plurality of chambers and through a plurality of curved, horizontally positioned, heated tubes which output the mixture to the intake manifold of the engine.

3 Claims, 2 Drawing Figures

FUEL SYSTEM

BACKGROUND OF THE INVENTION

1. Field of the Invention

This invention relates to gasoline-fueled internal combustion engines, and particularly to a device for the enhanced vaporization of the fuel-air mixture which is supplied to an engine.

2. General Description of the Prior Art

In the past, various devices have been proposed to further vaporize the fuel-air mixture from a conventional carburetor before supplying it to an engine. Typically in such a device, there would be provided a heated chamber or a plurality of heated tubes which would couple the mixture from the carburetor to the intake manifold. As a result, the mixture from the carburetor is more effectively vaporized. It has been found that by improved vaporization, improved combustion and greater engine efficiency can be achieved. Particularly pertinent art of the type referred to is illustrated in U.S. Pat. Nos. 3,762,385 and 3,797,468. Both of these patents are directed to improvement in combustion by enhanced vaporization, and one of them, Patent 3,762,385, describes a device employing a lengthened heated labyrinth, which the inventor claims increases operating efficiency by approximately 10%.

It is the object of this invention to provide an improved vaporization device wherein still greater engine efficiency is achieveable.

SUMMARY OF THE INVENTION

The vaporization device of this invention employs a first intermediate manifold which receives a downward flow of a fuel-air mixture from a carburetor, changes the direction of flow to a horizontal one, then passes the mixture through a plurality of horizontal tubes, which are both heated and curved to effect a 180° change in direction of flow, and which feed the mixture to a second intermediate manifold, which again changes the direction of flow of the mixture to a new horizontal direction, and finally turns the flow downward and supplies it to the intake manifold of the engine.

DETAILED DESCRIPTION OF THE DRAWINGS

Figure 1:
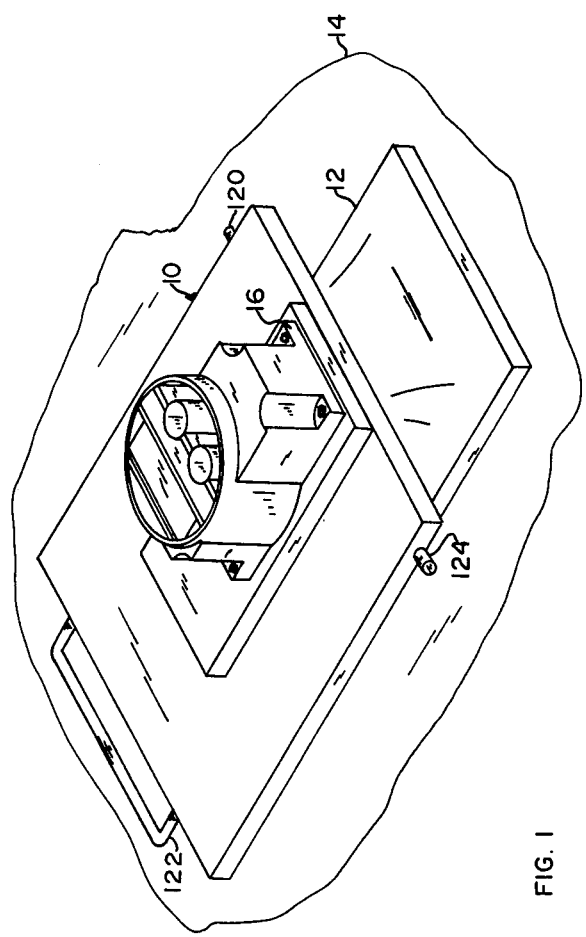
FIG. 1 is a pictorial view generally illustrating the arrangement of components as contemplated by this invention.
Figure 2:
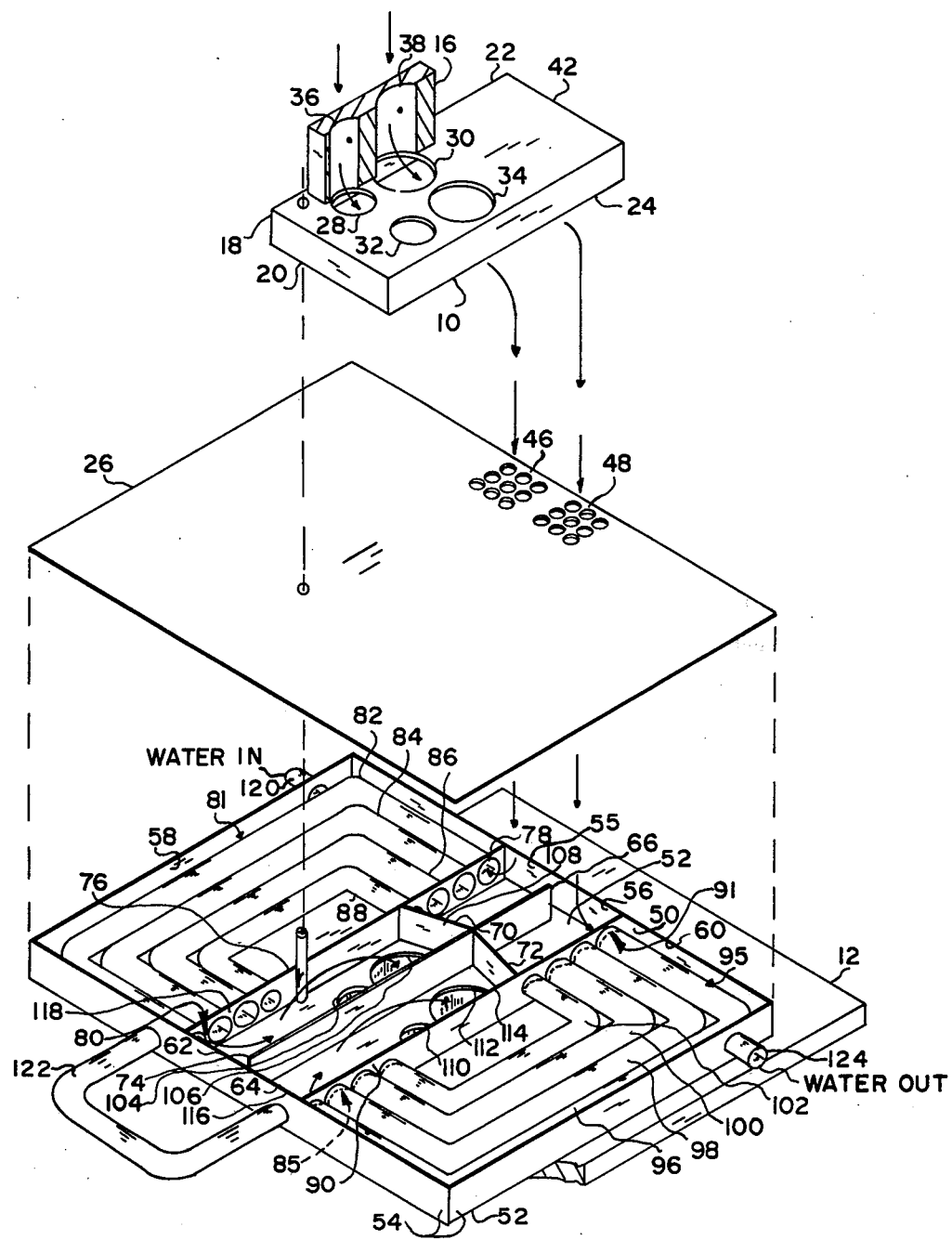
FIG. 2 is an exploded pictorial view of the vaporization device of this invention.

Referring first to FIG. 1, vaporizer 10 is adapted to be attached to the intake manifold 12 of an engine 14 between the intake manifold and a conventional carburetor 16. Referring to FIG. 2, carburetor 16, shown only partially, is attached (by means not shown) to a first end region 18 of an elongated, rectangular top chamber 20, formed of top plate 22, sides 24, and is generally closed at the bottom by an enlarged plate 26, upon which the bottom edges of sides 24 attach (by means not shown). Four openings 28, 30, 32, and 34 are formed in top plate 22 in alignment with barrels 36 and 38 of carburetor 16. For purposes of illustration, carburetor 16 is shown as a 4-barrel carburetor. These four openings are positioned in end region 18 of chamber 20. Left openings 28 and 30 couple to the left carburetor barrels 36 and 38, and right openings 32 and 34 couple to the right carburetor barrels (not shown). Openings 28, 30, 32, and 34 are positioned on plate 22 so that they appear in an end region of chamber 42 opposite to end region 18. Thus, an air-gasoline mixture from carburetor 16 flowing down through openings 28, 30, 32, and 34 strikes plate 26 and then changes direction, flowing longitudinally through chamber 20 until it reaches end region 42 of the chamber. At this point, the mixture is changed in a direction again by the end wall (not shown) and flows downward through openings 46 and 48. Plate 26 also forms the top of a general enclosure 50, having a bottom plate 52 and side plates 54.

Enclosure 50 is generally divided into left and right intake manifold chambers 55 and 56, left and right heat exchange chambers 58 and 60, and left and right outlet manifold chambers 62 and 64. Left opening 46 of plate 26 provides flow into left intake manifold chamber 55, and opening 48 provides inlet flow into right inlet manifold chamber 56. Left and right intake manifold chambers 55 and 56 are generally separated by divider plate 66 and are separated from outlet manifold chambers 62 and 64 by divider plates 70 and 72. Left and right outlet manifold chambers 62 and 64 are generally separated by divider plate 74.

A left manifold side plate 76 extends along and forms a left side of left inlet manifold 55 and outlet manifold 62, and plate 76 includes a first set of four outlet openings 78 in left inlet manifold 55 and a first set of four inlet openings 80 in left outlet manifold 62. A tube set 81 formed of U-shaped tubes 82, 84, 86, and 88 connect between discrete inlet and outlet openings of the left inlet and outlet manifolds. These tubes are enclosed within left heat exchange chamber 58.

A right manifold side plate 90 extends along and forms the right side of right inlet manifold 58 and right outlet manifold 64. There is provided in it a set of four outlet openings 85 in right inlet manifold 56 and a set of four inlet openings 91 in right outlet manifold 64. A U-shaped tube set 95 comprises tubes 96, 98, 100, and 102 which connect between outlet openings of right inlet manifold 56 and inlet openings of right outlet manifold 64. Tubes 96, 98, 100, and 102 are enclosed within right heat exchange chamber 60.

The tubes of tube sets 81 and 95 lie horizontal in their U shape, enabling them to make their connections in a minimum of space. Openings 104 and 106 in left outlet manifold chamber 62 conform to a like opening arrangement in intake manifold 12 of engine 14, and these openings are positioned in an opposite end region 108 of chamber 62 with respect to inlet openings 80, whereby a gasoline-air mixture transiting tubes 81 from left inlet manifold chamber 55 enters outlet manifold chamber 62 at its most distant region. As thus configured, the mixture first impinges on divider wall 74, is then forced to change direction, and flows to transit the length of left outlet manifold chamber 62. It then strikes divider wall 70 and is forced to change direction again, after which it is drawn down through one or both of openings 104 and 106 to engine 14. Similarly, right outlet manifold chamber 64 is configured with openings 110 and 112 in end region 114 and outlet openings of tube sets 95 in end region 116 of chamber 64, and thus flow follows the same pattern described for left outlet manifold chamber 62.

Heat exchange chambers 58 and 60 receive heated liquid (desirably at least 180° F.) through inlet 120

(FIG. 1) from the cooling system of engine 14 (not shown). The liquid is free to flow around tube set 81, thence through interconnecting tube 122, and around tube set 95 and completely cover them and exit through outlet 124.

In operation, an air-gasoline mixture (indicated by arrows) determined by carburetor 16 is drawn (by engine vacuum) through openings 28, 30, 32, and 34 and to chamber 20 where it strikes plate 26, and the turbulence produced effects some vaporization. Since plate 26 is generally heated by the liquid in heat exchange chambers 58 and 60, the mixture strikes a heated plate. This effects some further vaporization of the mixture, caused by the combination of the heated surface and turbulence produced by striking plate 26. Next, the mixture is drawn along the longitudinal dimension of chamber 20 and in contact with heated plate 26 until a part of the mixture is directly drawn through openings 46 and 48 downward. The portion drawn through openings 46 enters left inlet manifold chamber 55 where it initially strikes bottom plate 52, which, like plate 26, extends as a cover for the heat exchange chambers, and thus is generally heated. By striking this cover, the combination of heat and further agitation still further vaporizes the mixture. Next, the mixture is drawn through tube set 81, making two 90° bends, and exits in end region 118 of left outlet manifold chamber 62. During this transit, and by virtue of the combination of confinement and substantial surface area engagement of the mixture on two walls, there is effected substantial heat transfer from the water to the mixture, and turbulence is created by the two bends. This appears to achieve a substantial vaporization effect on the mixture. In left outlet manifold chamber 62, the mixture initially strikes divider plate 74 and is thus agitated, after which it is drawn along the longitudinal dimension of chamber 62 until it is either initially drawn through openings 104 and 106, or after impingement with divider plate 70, is drawn through openings 104 and 106 to intake manifold 12 of engine 14. By virtue of this transiting of chamber 62 and impingement upon plate 74, it experiences an additional heating effect by virtue of plate 74 and agitation by virtue of contact with divider plate 70 before being drawn into intake manifold 12. As a result, the mixture entering intake manifold 12 is substantially vaporized and vaporized most uniformly, resulting in a most homogeneous vapor being applied to engine 14.

The flow through right inlet manifold chamber 56 and tubes 95 in right heat exchange chamber 60 and right outlet manifold chamber 64 occur in the same manner and achieve the same results.

Tests of the device of this invention have been conducted with a variety of automobiles, including a 1967 Chrysler with a 383-cubic inch engine, where gasoline mileage was improved from approximately 12 to approximately 16 miles per gallon on an average of highway-city driving; a 1968 Chevrolet with a 327-cubic inch engine, where improvement was from approximately 13 to 18 miles per gallon on an average of highway-city driving; and a 1973 Chevrolet truck with a 355-cubic inch engine, where the gas mileage was increased from approximately 12 to 17 miles per gallon on an average of highway-city driving. These figures represent averages for combined city and highway driving. They indicate an average increase in gasoline mileage for these vehicles of over 30%, believed to be clearly a significant improvement over that which has previously been obtained by devices of the prior art.

Having thus described my invention, what is claimed is:

1. A combination comprising:
   an internal combustion engine having an intake manifold with a horizontally positioned surface having therein at least one inlet orifice (a) positioned to receive an air-gasoline mixture entering in a vertical direction;
   a carburetor adapted to provide at at least one output orifice (b) an air-gasoline mixture;
   a fuel vaporizer having an inlet orifice (c) adapted to mate with said outlet orifice (b) of said carburetor, and having an outlet orifice (d) adapted to mate with said inlet orifice (a) of said intake manifold, comprising:
      an elongated, horizontal, generally closed intake chamber having in its top one end region said orifice (c) and in its bottom at an opposite end region an outlet orifice (e),
      a first manifold chamber positioned below and connecting with said orifice (c) and having a side wall having at least one set of a plurality of vertically positioned tubular openings (f) arranged generally horizontally in a vertical plate (g) of said side wall, which plane is generally parallel to the longitudinal dimension of said elongated chamber, and
      a second elongated manifold chamber adjacent to and generally at the same level as said first manifold chamber, and at least partially under said elongated intake chamber, and having a side wall having a plurality of vertically positioned tubular openings (h) arranged generally horizontally along said vertical plane (g) and in said last-named side wall and in a first end region of said second manifold chamber, and having in its bottom at an opposite end region an orifice (i) adapted to mate with said orifice (a) of said intake manifold of said engine;
   at least one set of a plurality of tubes connected between said openings of said first and second manifold chambers, said set of tubes generally lying horizontal in a common plane, and each tube being generally configured to form a "U"; and
   a liquid holding chamber surrounding said set of tubes and being adapted to be connected to a cooling system of the engine, whereby liquid heated by the engine would flow in said liquid holding chamber and heat said tubes.

2. A combination as set forth in claim 1:
   further comprising a second liquid holding chamber, and said liquid holding chambers are positioned on opposite sides of said manifold chambers; and
   further comprising a second set of a plurality of tubes connected between openings of said first and second manifold chambers; and
   one of said sets of a plurality of tubes is positioned within said first-named liquid holding chamber, and the other of said sets of a plurality of tubes is positioned within said second liquid holding chamber.

3. A combination as set forth in claim 2 wherein said first and second manifold chambers are each divided into two chambers, and said first set of tubes connects between one of said two chambers of said first manifold chamber and one of the two chambers of said manifold chambers, and the other of said sets of tubes connects between the other chamber of said first manifold chamber and the other chamber of said second manifold chamber.

* * * * *